United States Patent
Chou et al.

(10) Patent No.: US 10,010,936 B2
(45) Date of Patent: *Jul. 3, 2018

(54) SYSTEMS AND METHODS FOR DESIGNING AND FABRICATING SUPPORT STRUCTURES FOR OVERHANG GEOMETRIES OF PARTS IN ADDITIVE MANUFACTURING

(71) Applicants: The Board of Trustees of The University Of Alabama, Tuscaloosa, AL (US); The United States of America, as Represented by the Administrator of the National Aeronautics and Space Administration, Washington, DC (US)

(72) Inventors: Yuag-Shan Chou, Tuscaloosa, AL (US); Kenneth Cooper, Huntsville, AL (US)

(73) Assignees: The Board of Trustees of The University of Alabma, Tuscaloosa, AL (US); The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 193 days.

This patent is subject to a terminal disclaimer.

(21) Appl. No.: 14/940,564

(22) Filed: Nov. 13, 2015

(65) Prior Publication Data

US 2017/0136539 A1 May 18, 2017

(51) Int. Cl.
*B32B 3/10* (2006.01)
*B22F 3/105* (2006.01)
(Continued)

(52) U.S. Cl.
CPC ............ *B22F 3/1055* (2013.01); *B33Y 30/00* (2014.12); *B33Y 50/00* (2014.12); *G06F 17/50* (2013.01);
(Continued)

(58) Field of Classification Search
None
See application file for complete search history.

(56) References Cited

U.S. PATENT DOCUMENTS 4,999,143 A 3/1991 Hull et al.
5,669,433 A 9/1997 Sterett et al.
(Continued)

OTHER PUBLICATIONS

Non final office action in U.S. Appl. No. 14/276,345 dated Oct. 14, 2016.
(Continued)

*Primary Examiner* — Christopher Polley
(74) *Attorney, Agent, or Firm* — Meunier Carlin & Curfman, LLC

(57) ABSTRACT

Systems and methods are provided for designing and fabricating contact-free support structures for overhang geometries of parts fabricated using electron beam additive manufacturing. One or more layers of un-melted metallic powder are disposed in an elongate gap between an upper horizontal surface of the support structure and a lower surface of the overhang geometry. The powder conducts heat from the overhang geometry to the support structure. The support structure acts as a heat sink to enhance heat transfer and reduce the temperature and severe thermal gradients due to poor thermal conductivity of metallic powders underneath the overhang. Because the support structure is minimally or not connected to the part, the support structure can be removed with minimal or no post-processing step.

16 Claims, 14 Drawing Sheets

(51) Int. Cl.
*B33Y 50/00* (2015.01)
*B33Y 30/00* (2015.01)
*G06F 17/50* (2006.01)
*B33Y 10/00* (2015.01)

(52) U.S. Cl.
CPC ....... *B22F 2003/1058* (2013.01); *B33Y 10/00* (2014.12); *G06F 2217/12* (2013.01)

(56) References Cited

U.S. PATENT DOCUMENTS

| | | |
|---|---|---|
| 5,746,844 A | 5/1998 | Sterett et al. |
| 5,787,965 A | 8/1998 | Sterett et al. |
| 6,410,105 B1 | 6/2002 | Mazumder et al. |
| 9,767,224 B2 * | 9/2017 | Chou ..................... G06F 17/50 |

OTHER PUBLICATIONS

Final Office Action issued in co-pending U.S. Appl. No. 14/276,345, dated Mar. 2, 2017.
Notice of Allowance issued in co-pending U.S. Appl. No. 14/276,345, dated May 15, 2017.
Co-pending U.S. Appl. No. 14/276,345, filed May 13, 2014.
"Software for additive manufacturing: Magics", published Jan. 29, 2013, accessed Mar. 20, 2016 via www.waybackmachine.org.

* cited by examiner

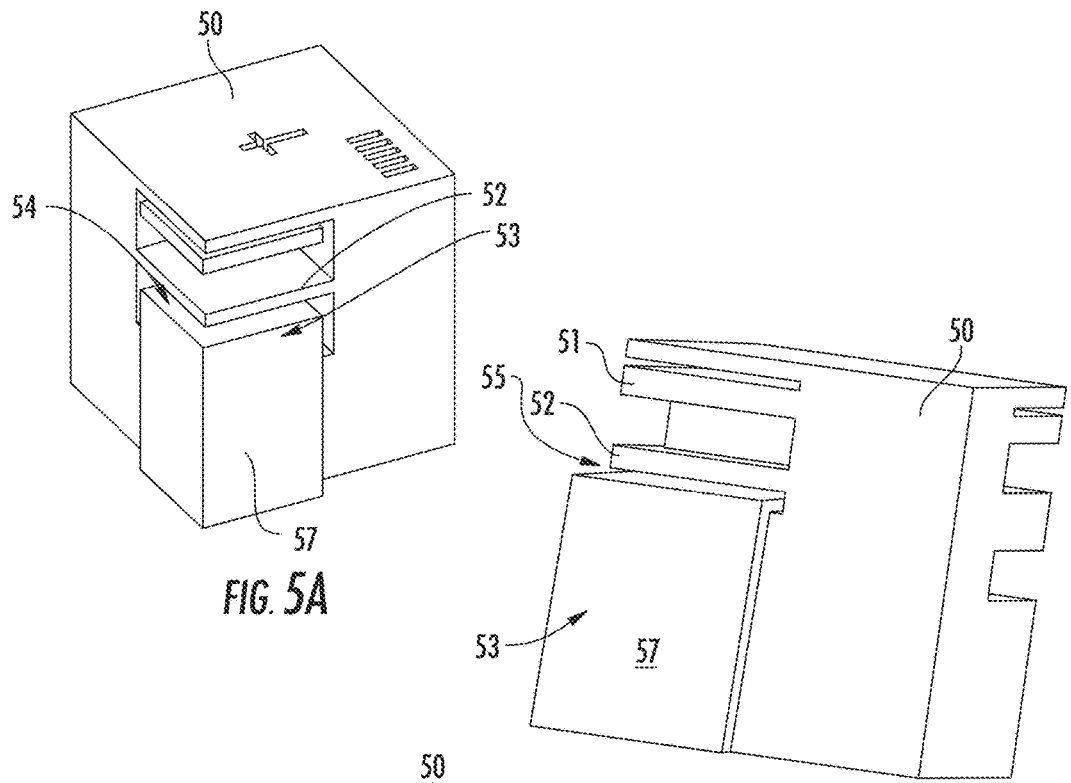
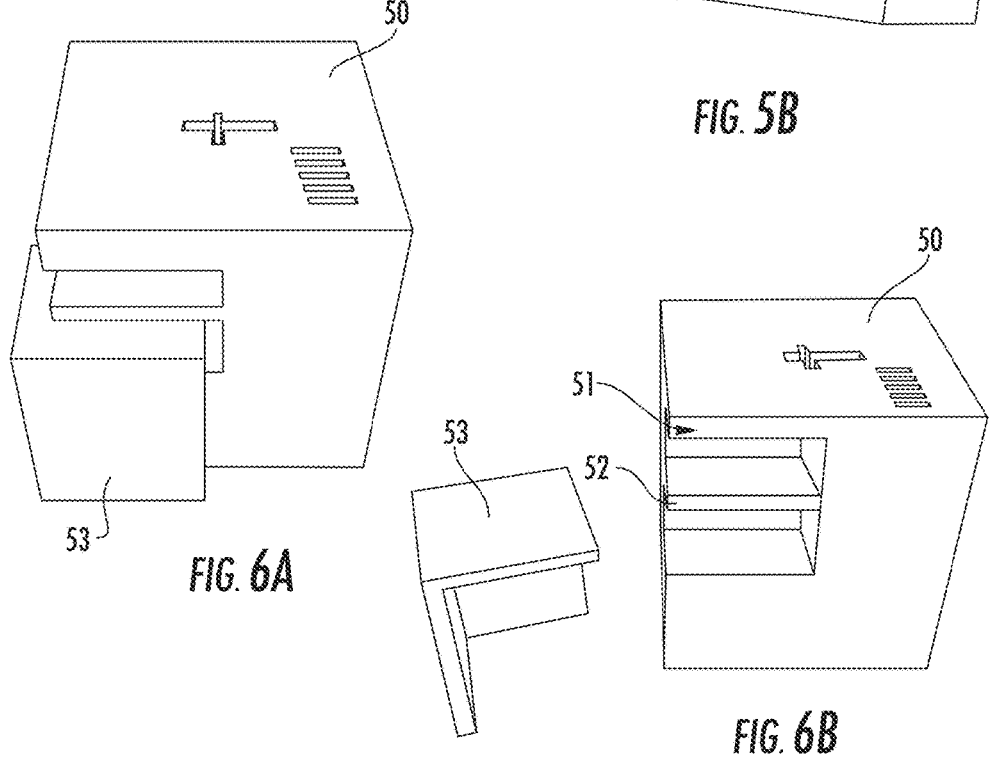

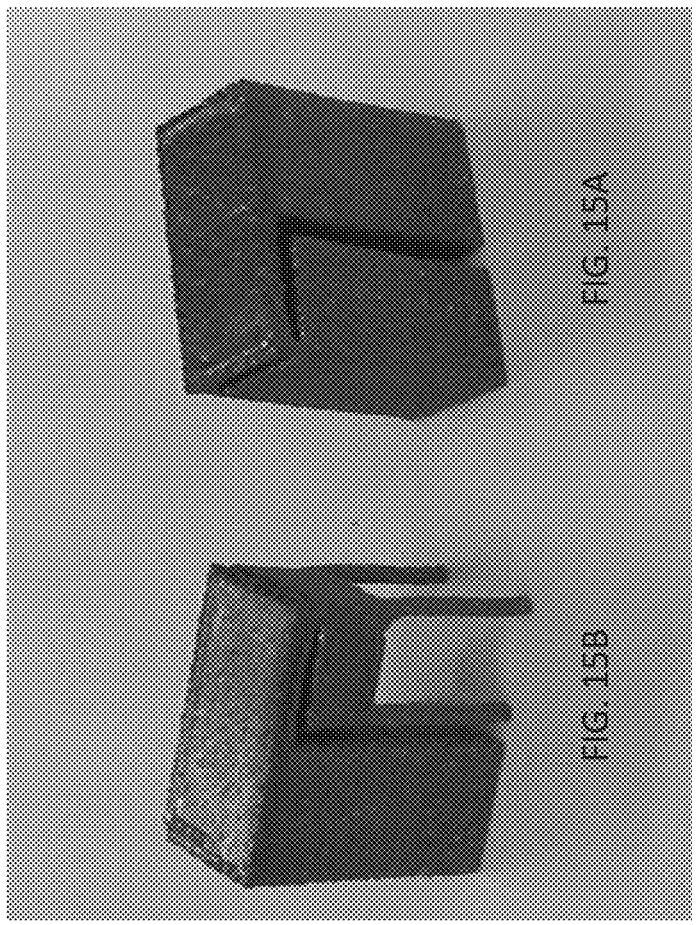

SYSTEMS AND METHODS FOR DESIGNING AND FABRICATING SUPPORT STRUCTURES FOR OVERHANG GEOMETRIES OF PARTS IN ADDITIVE MANUFACTURING

STATEMENT REGARDING FEDERALLY SPONSORED RESEARCH

This invention was made with government support under Grant No. NNX11AM11A awarded by NASA. The government has certain rights in the invention.

BACKGROUND

Implementations of the present invention relate to methods of designing and fabricating support structures for overhang geometries of parts produced using additive manufacturing.

Powder-based electron beam additive manufacturing (EBAM) is an additive manufacturing (AM) technology by which physical solid parts are made, layer-by-layer, directly from electronic data. The electronic data is generally provided in files from computer-aided design (CAD) software. EBAM utilizes a high-energy electron beam, as a moving heat source, to melt and fuse metallic powders and produce parts in a layer-wise fashion. Powders made of other materials may also be used in the process.

If a part has overhang geometry, such as a cantilevered overhang or undercut portion, defects such as curling may occur due to the thermal gradient cycles that lead to high thermal stresses and geometric deformation. FIG. 1A illustrates a CAD model of a part 10 having two overhang portions 11, 12, and FIG. 1B illustrates the part 10 fabricated using EBAM without a support structure and curling at the end of the overhang portions 11, 12.

A current practice for countering this curling effect is to build a support structure with the part that connects the overhang portion with the support structure. In particular, the geometry of the support structure is incorporated in the part model (CAD format) and becomes solid from metallic powders during the EBAM process, connecting the support structure to the overhang portion. FIG. 2A illustrates an example of a typical lattice support design 20a, 20b for upper and lower overhang portions, respectively. Although the support structure 20a, 20b may eliminate the part deformation problem, the support structure 20a, 20b is bonded to the part and needs to be removed in post-processing using a mechanical tool, typically. This process is laborious, time consuming, and degrades the surface quality of the cantilevered portion. FIG. 2B shows support structure 20b mostly removed from the example part.

Accordingly, improved methods and articles of manufacture are needed to reduce labor and time required for fabrication and to improve the quality of the part.

BRIEF SUMMARY

Systems and methods are provided for designing and fabricating contact-free support structures for overhang geometries of parts fabricated using electron beam additive manufacturing. One or more layers of un-melted metallic powder are disposed in an elongate gap between an upper horizontal surface of the support structure and a lower surface of the overhang geometry. The powder conducts heat from the overhang geometry to the support structure. The support structure acts as a heat sink to enhance heat transfer and reduce the temperature and severe thermal gradients due to poor thermal conductivity of metallic powders underneath the overhang. Because the support structure is minimally or not connected to the part, the support structure can be removed with minimal or no post-processing step.

According to certain implementations, an article of manufacture includes a part and a support structure. The part includes at least one overhang portion, and the overhang portion has a lower surface. The support structure includes a parallel support portion and at least one substantially vertical support portion extending between the parallel support portion and the lower surface of the overhang portion. The parallel support portion lies within a plane that is substantially parallel with the lower surface of the overhang portion. The lower surface of the overhang portion and the support structure are fabricated during one process, and the upper surface of the parallel support portion of the support structure and the lower surface of the overhang portion of the part define an elongate gap there between. Un-melted powder is disposed within the gap. The at least one vertical support portion has a first surface area in contact with the lower surface of the overhang portion and the lower surface of the overhang portion has a second surface area. A ratio of the first surface area to the second surface area is less than or equal to about 0.02.

Other implementations include a method of designing a support structure. The method includes: (1) receiving dimensions of a part comprising at least one overhang portion, the overhang portion having a lower surface; (2) receiving dimensions of a support structure comprising a substantially parallel support portion and at least one vertical support portion extending from an upper surface of the substantially parallel support portion and the lower surface of the overhang portion, the upper surface of the parallel support portion lying in a plane that is substantially parallel with the lower surface of the overhang portion, and the upper surface of the parallel support portion and the lower surface of the overhang portion defining an elongate gap; (3) calculating temperature distributions expected on the part during fabrication thereof using additive manufacturing; and (4) calculating a thickness range of the at least one vertical support portion and un-melted powder to be disposed within the elongate gap during fabrication of the part. Calculating the thickness range includes balancing conduction of heat from the overhang portion to the substantially parallel support portion against potential fusion of the un-melted powder.

BRIEF DESCRIPTION OF THE DRAWINGS

FIG. 5A illustrates a perspective view of a CAD model of a part and support structure according to one implementation.

FIG. 5B illustrates a perspective view of the CAD model in FIG. 5A from another perspective.

FIG. 6A illustrates the part shown in FIGS. 5A and 5B fabricated using EBAM.

FIG. 6B illustrates the part shown in FIG. 6A with the support structure freely removed from the part.

FIG. 15A illustrates a perspective view of the part and minimal contact support structure shown in FIG. 9.

FIG. 15B illustrates a perspective view of the part and minimal contact support structure shown in FIG. 13.

DETAILED DESCRIPTION

Systems and methods are provided for designing and fabricating contact-free support structures for overhang geometries of parts fabricated using electron beam additive manufacturing. One or more layers of un-melted metallic powder are disposed in an elongate gap between an upper horizontal surface of the support structure and a lower surface of the overhang geometry. The powder conducts heat from the overhang geometry to the support structure. The support structure acts as a heat sink to enhance heat transfer and reduce the temperature and severe thermal gradients due to poor thermal conductivity of metallic powders underneath the overhang. Because the support structure is minimally or not connected to the part, the support structure can be removed with minimal or no post-processing step.

In powder-based electron beam additive manufacturing (EBAM), physical solid parts are made, layer-by-layer, directly from electronic data, such as files from computer-aided design (CAD) software. EBAM utilizes a high-energy electron beam as a moving heat source to melt and fuse metallic powders and produce parts in a layer-wise fashion. Exemplary advantages of using additive manufacturing include short lead time, design freedom in geometry, and lack of tooling. In addition, EBAM allows for fabricating full-density metallic parts.

Figure 1A:
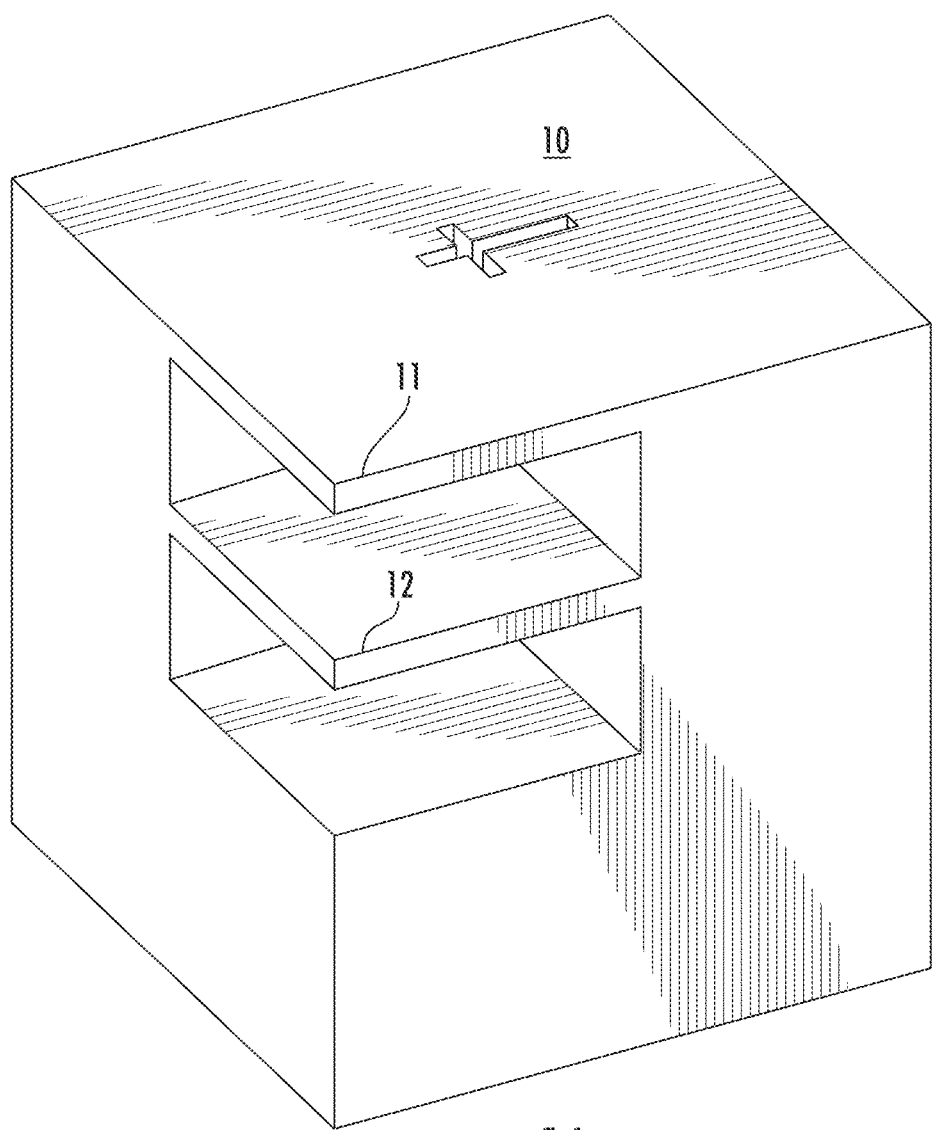
FIG. 1A illustrates a CAD model of a part having two overhang portions according to one implementation.
Figure 1B:
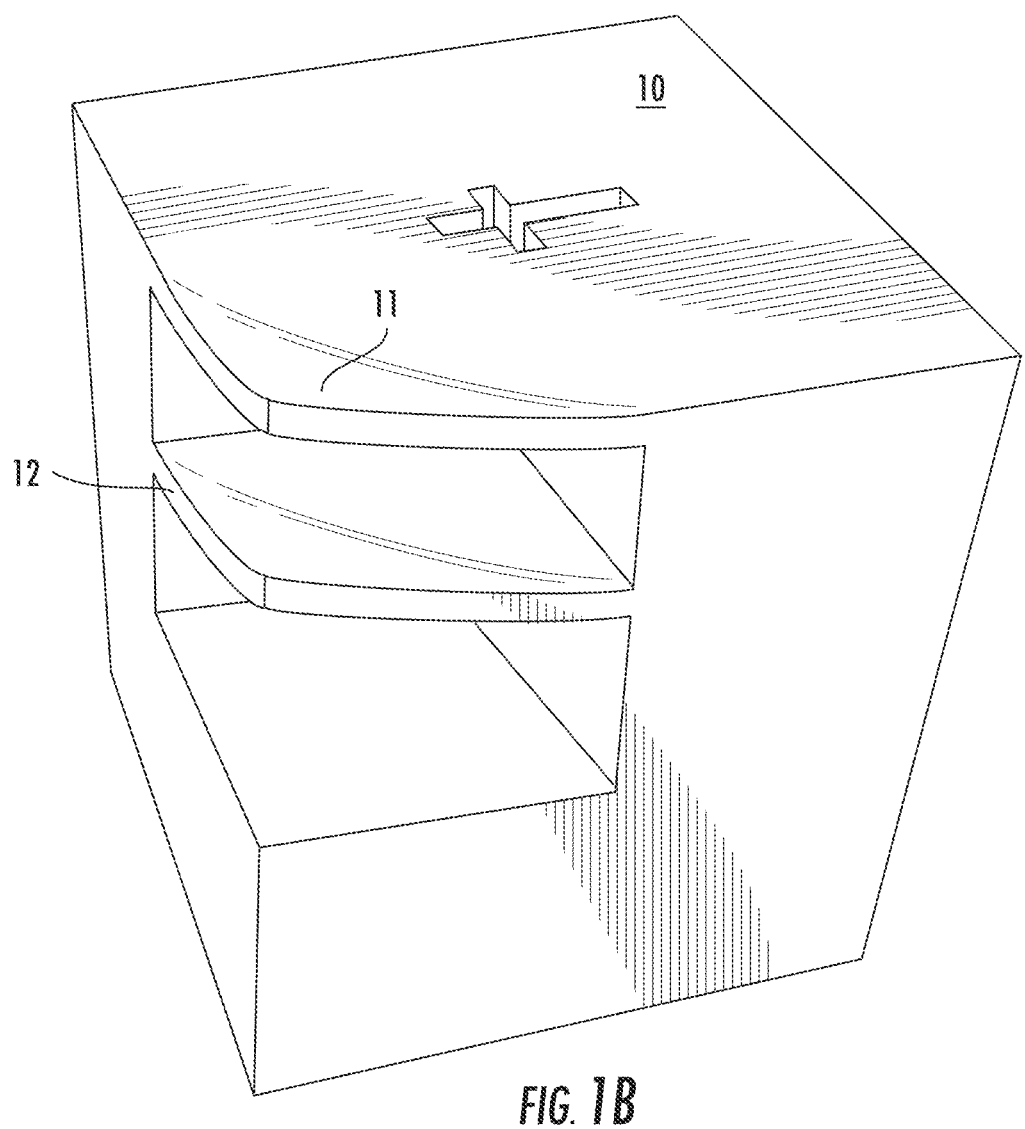
FIG. 1B illustrates the part shown in FIG. 1A fabricated using EBAM without a support structure.
Figure 2A:
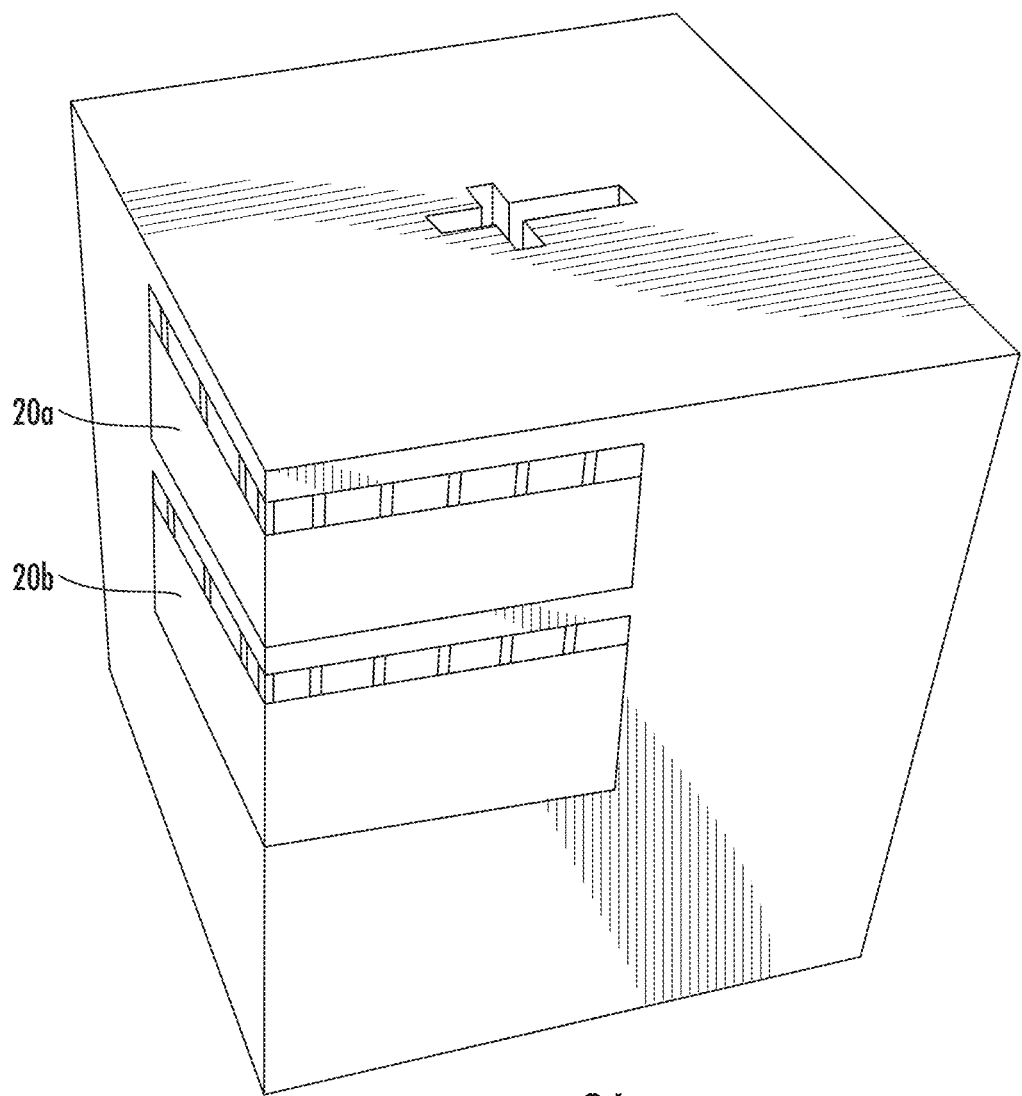
FIG. 2A illustrates an exemplary, prior art support structure for the part shown in FIG. 1A fabricated using EBAM.
Figure 2B:
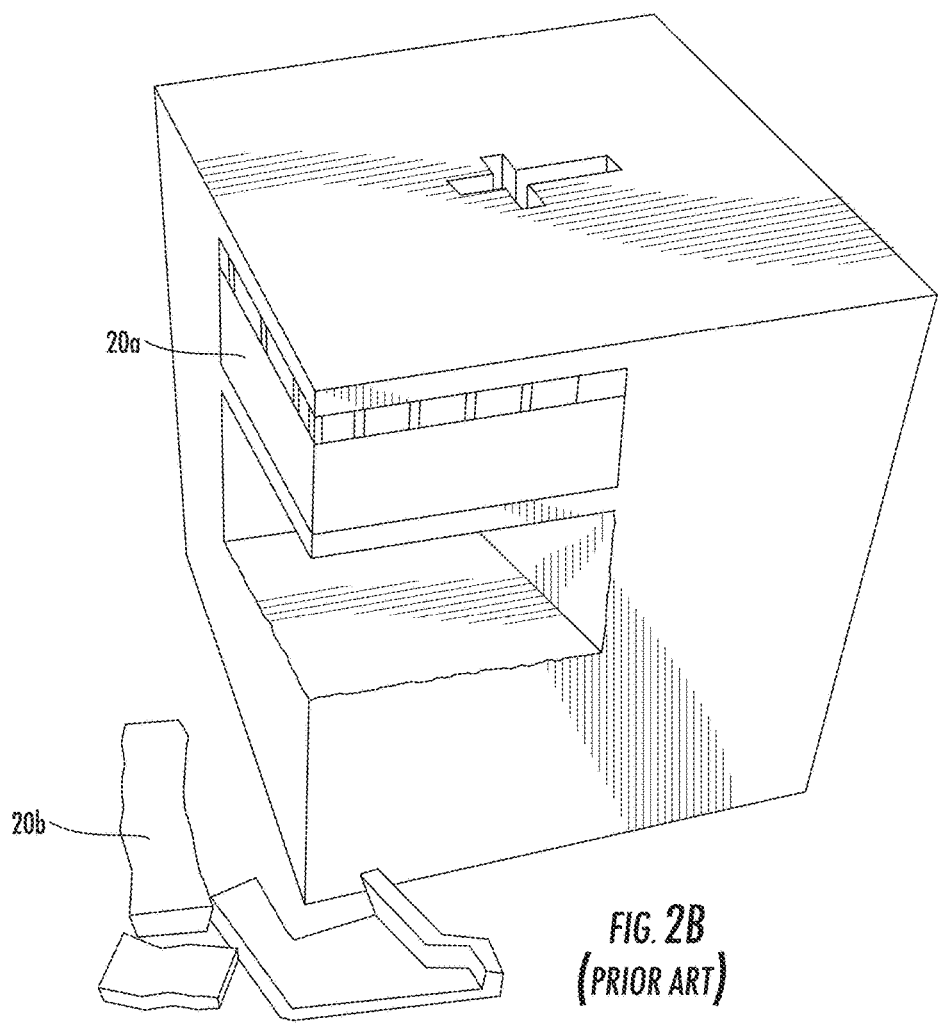
FIG. 2B illustrates the support structure in FIG. 2A partially removed.
Figure 3A:
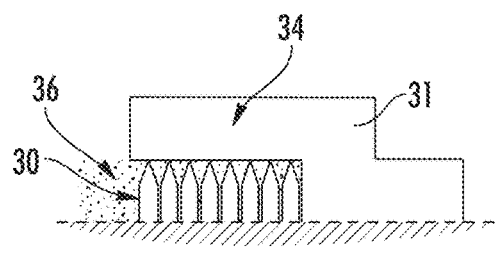
FIG. 3A illustrates a side view schematic of a prior art support structure.

As discussed above in relation to FIGS. 1A and 1B, the root mechanism of overhang defects is severe thermal gradients due to poor thermal conductivity of metallic powders used in the process. Conventional support designs, such as the design shown in FIGS. 2A and 3A, may include a lattice support structure that is bonded to the part and needs to be physically cut or broken from the part after fabrication with a mechanical tool. This post-processing step may be time consuming and cumbersome. FIG. 3A illustrates another exemplary support structure 30 that is bonded to an overhang portion 34 of a part 31. The ratio of the length of an outer perimeter of the support structure 30 to the length of an outer perimeter of the overhang portion 34 may be at least 0.5.

Figure 3B:
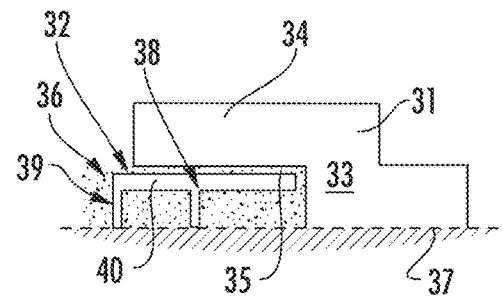
FIG. 3B illustrates a side view schematic of a contact-free support structure according to one implementation.

FIG. 3B illustrates an example of an improved, contact-free support structure 35 according to one implementation. The support structure 35 is fabricated with the part 31, or work piece, using EBAM or other suitable additive manufacturing process. The part 31 includes a substantially vertical portion 33 and at least one substantially horizontal overhang portion 34 extending from the substantially vertical portion 33. The support structure 35 includes a substantially horizontal support portion 40, an internal vertical support portion 38, and an external vertical support portion 39. The vertical support portions 38, 39 extend between the horizontal support portion 40 and a build plate 37. An upper surface of the horizontal support portion 40 of the support structure and a lower surface of the overhang portion 34 of the part 31 define an elongated gap 32 therebetween, and un-melted metallic powder 36 is disposed within the gap 32. The thickness, or height, range of the gap 32 is sized such that the un-melted metallic powder 36 in the gap 32 is configured for conducting heat from the overhang portion 34 of the part 31 to the support structure 35 without fusing the part 31 to the support structure 35. In other words, the gap 32 is configured for providing a necessary rate of heat dissipation without reaching a fusion threshold for the powder. According to various implementations, the length to height ratio for the elongate gap 32 may differ depending on the structure to be manufactured. For example, in certain implementations, the length to height ratio for the gap may be between about 1 and about 10. However, in other implementations, the ratio may be greater than about 10. For example, in one exemplary structure, the gap has a length of about 11.7 mm and a height of about 0.64 mm, resulting in a ratio of about 18.

The support structure 35 acts as a heat sink to enhance heat transfer, lower part temperatures, thermal gradient, and thus, eliminate part deformations. The gap 32, which is filled with un-melted metallic powders 36 as occurs during the process, is designed to be suitable to the process and part 31. If the gap 32 is too small, the gap 32 will be fused with the overhang portion 34. If the gap 32 is too large, the heat dissipation will not be efficient for temperature reductions. A comprehensive heat transfer analysis is used to determine the feasible range of the gap 32 necessary for efficient heat conduction. In addition, vertical pieces 38, 39 extend to the build plate 37 and serve as the heat flow channel. Hence, the contact-free support structure 35 is designed for the "heat-load" purpose. Because the support structure 35 is not for supporting the weight of the part 31, direct contact between the support structure 35 and the part 31 is possible but not necessary.

FIGS. 5A and 5B illustrate a CAD model of another part 50 from different perspectives, according to one implementation. The part 50 has two overhang portions 51, 52 and a contact-free support structure 53. The support structure 53 includes a horizontal support portion 54 disposed underneath the lower overhang 52 with a gap 55 of about 0.6 mm (with about 12% tolerance) defined between the horizontal support portion 54 and the lower overhang 52. The support structure 53 also includes a vertical plate 57 that extends to the build plate.

FIGS. 6A and 6B illustrate the part 50 and the support structure 53 shown in FIGS. 5A and 5B fabricated using EBAM. The part 50 and the support structure 53 are continuously spaced apart from each other (i.e., they have no rigid connections) and are fabricated substantially simultaneously with each other. FIG. 6A illustrates the part 50 with the contact-free support structure 53 partially removed. FIG. 6B illustrates the part 50 and the support structure 53 completely removed, showing no warping defect on the part's 50 overhang portions 51, 52.

In the implementations described above with respect to FIGS. 3B and 5A-6B, the support structure does not contact the overhang portion of the part. However, in some implementations, the support structure may minimally contact the part. This minimal contact may result from incidental fusion of the powder in the elongate gap or from intentional fusion of a portion of the powder. Having a minimal contact, such as, for example, a surface area ratio of less than or equal to 0.02 of the surface area of the contact and the surface area of the lower surface of the overhang portion, prevents warping defects on the overhang portion and does not add significant post-processing steps.

Figure 11:
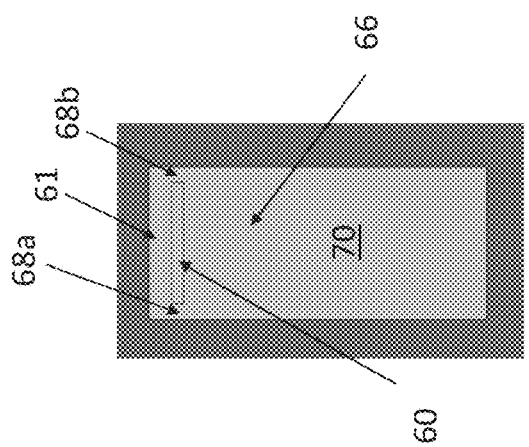
FIG. 11 illustrates a side view of the part and minimal contact support structure shown in FIG. 9.
Figure 10:
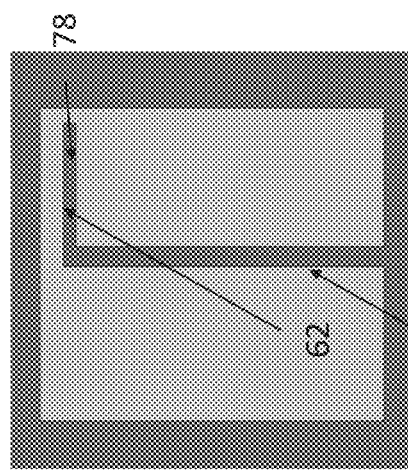
FIG. 10 illustrates a front view of the part and minimal contact support structure shown in FIG. 9.
Figure 9:
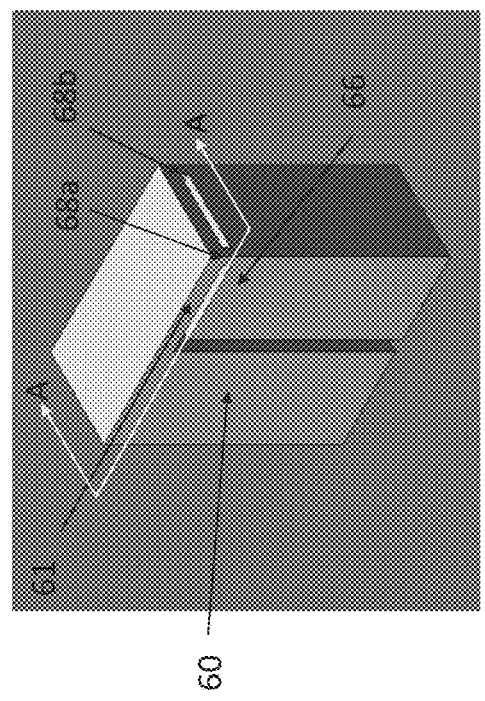
FIG. 9 illustrates a perspective view of a part and a minimal contact support structure according to one implementation.

For example, FIGS. 9 through 11 illustrate a part 60 having at least one overhang portion 61 and a support structure having minimal contact with the overhang portion 61. The overhang portion 61 has a lower surface 62. The support structure has a substantially parallel support portion 66 and two upper, substantially vertical support portions 68a, 68b. The upper vertical support portions 68a, 68b are legs that extend between an upper surface of the parallel support portion 66 and lower surface 62 of the overhang portion 61. The upper vertical support portions 68a, 68b are disposed adjacent distal corners of the overhang portion 61. However in other implementations, the support structure may include one or more upper vertical support portions, and the vertical support portions may be disposed adjacent another portion of the overhang portion and/or the support structure.

Figure 12:
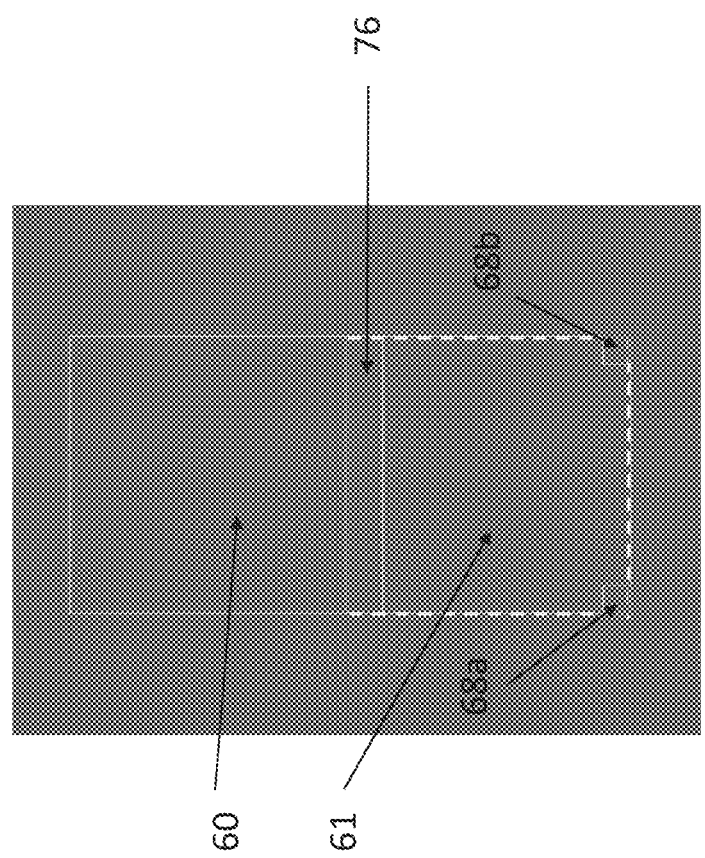
FIG. 12 illustrates a cross sectional view of the part and minimal contact support structure taken through the A-A line in FIG. 9.

The total amount of surface area between the upper vertical support portions 68a, 68b and the lower surface 62 is a total contact surface area. For example, in the implementation shown in FIG. 12, each upper vertical support portion 68a, 68b is 1 mm by 1 mm, resulting in a total contact surface area of 2 mm². The ratio of the contact surface area to the surface area of the lower surface 62 of the overhang portion 61 is less than or equal to 0.02, according to certain implementations. For example, as shown in FIG. 12, the lower surface 62 has a surface area of 100 mm², resulting in a ratio of 0.02.

Furthermore, the lower surface 62 of the overhang portion 61 defines an outer perimeter, and the length of the outer perimeter is an overhang portion perimeter. The overhang portion perimeter includes a length to and of a distal end of the lower surface 62 of the overhang portion 61. For example, if the lower surface 62 of the overhang portion 61 is 10 mm by 10 mm, the overhang portion perimeter is 30 mm. In addition, each of the upper vertical support portions 68a, 68b defines an outer perimeter in contact with the lower surface 62 of the overhang portion 61, and the total length of the outer perimeter of the upper vertical support portions 68a, 68b contacting the lower surface 62 is the vertical support portion perimeter. For example, if the upper vertical support portions 68a, 68b are 1 mm×1 mm, the vertical support portion perimeter is 4 mm (i.e., each vertical support portion 68a, 68b has an outer perimeter of 2 mm). The ratio of the vertical support portion perimeter to the overhang portion perimeter is less than or equal to 0.13.

The support structure shown in FIGS. 9 through 11 also includes one or more lower vertical support portions 70. The one or more lower vertical support portions 70 extend between the parallel support portion 66 and the build plate 72 and are configured for conducting heat from the parallel support portion 66 to the build plate 72. The lower vertical support portions 70 may include, for example, one or more walls or one or more legs that extend from the parallel support portion 66 to the build plate 72. In the implementations shown in FIGS. 9-11, 15A, and 16, the lower vertical support portion 70 is a solid rectangular prism that extends below the parallel support portion 66. However, in other implementations, the vertical support portion 70 may be partially solid.

Unmelted powder disposed in a vertical gap 76 defined between the wall adjacent the part 60 and in a horizontal gap 78 defined between the parallel support portion 66 and the lower surface 62 of the overhang portion 61 may further assist with conducting heat from the overhang portion 61 to the build plate 72 without fusing.

Figure 14:
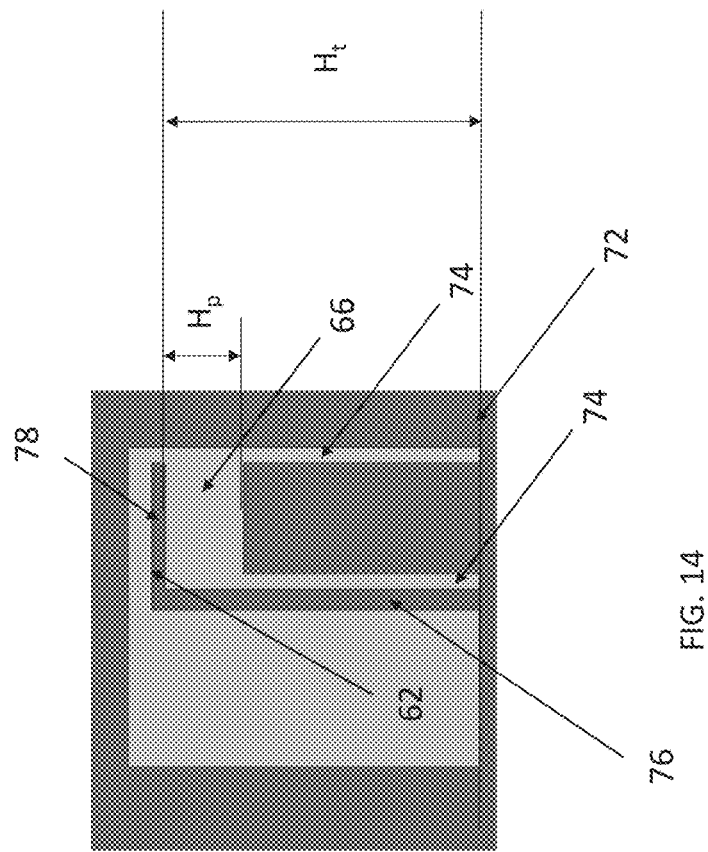
FIG. 14 illustrates a front view of the part and minimal contact support structure shown in FIG. 13.
Figure 13:
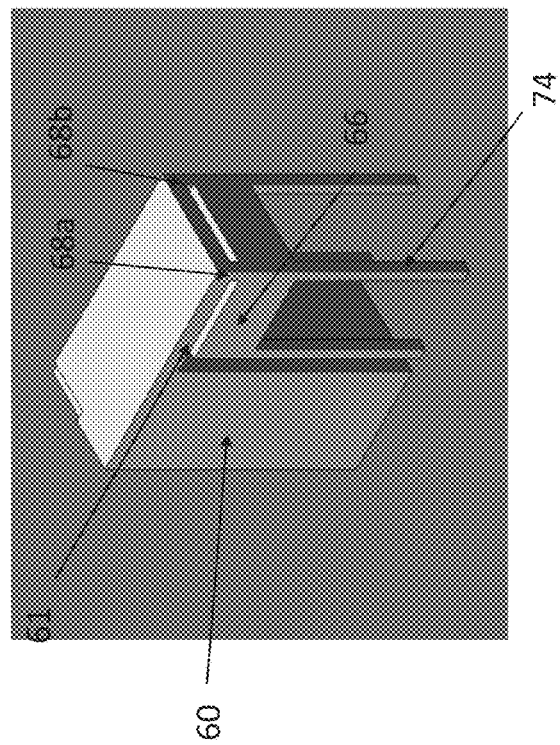
FIG. 13 illustrates a perspective view of a part and a minimal contact support structure according to another implementation.
Figure 16:
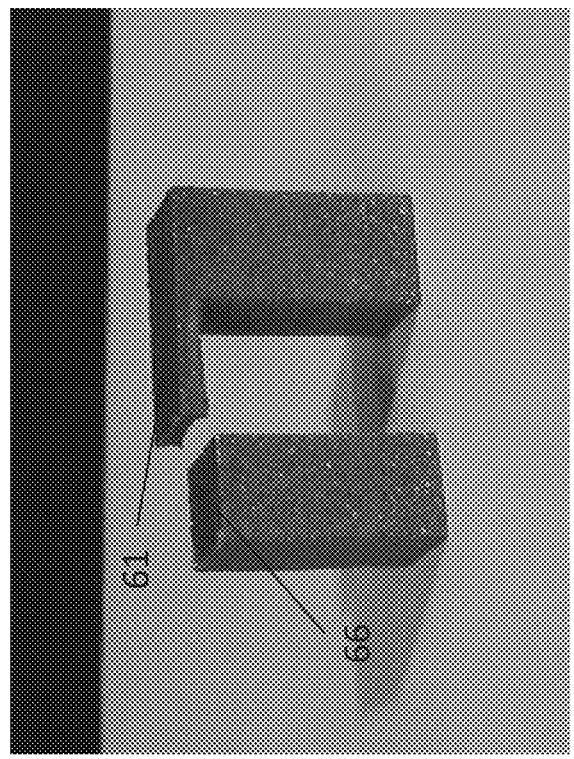
FIG. 16 illustrates a perspective view of the part and minimal contact support structure shown in FIG. 15A with the support structure removed from the part.

In other implementations, such as shown in FIGS. 13 through 15, the lower vertical support portion 70 includes four legs 74 that extend from perimeter portions of the parallel support portion 66. In the implementation shown in FIGS. 13-14 and 15B, legs 74 extend from corners of the parallel support portion 66. A height $H_p$ of the parallel support portion 66 is about 0.25 of the height $H_t$ between the upper surface of the parallel support portion 66 and the build plate 72, and the height of the legs is about 0.75 of $H_t$. For example, if the total height $H_t$ is about 20 mm, the height $H_p$ of the parallel support portion 66 is about 5 mm, and the height of the legs 74 is about 15 mm. Furthermore, in some implementations, the ratio of the outer perimeter of the legs 74 to the outer perimeter of the parallel support portion 66 may be greater than about 0.2. For example, if each leg 74 is 1 mm long by 1 mm wide and the parallel support portion 66 is 9 mm long by 10 mm wide, the ratio of the outer perimeter of the legs 74 to the outer perimeter of the parallel support portion 66 is about 0.21.

Figure 18:
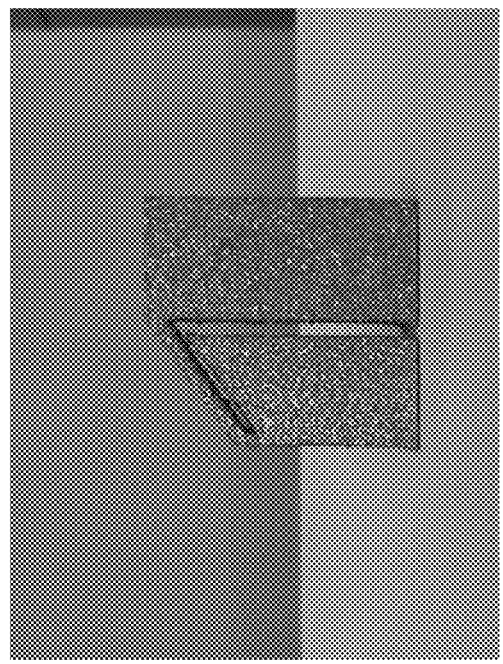
FIG. 18 illustrates a front view of a part having a sloped overhang portion and a minimal contact support structure according to another implementation.
Figure 17:
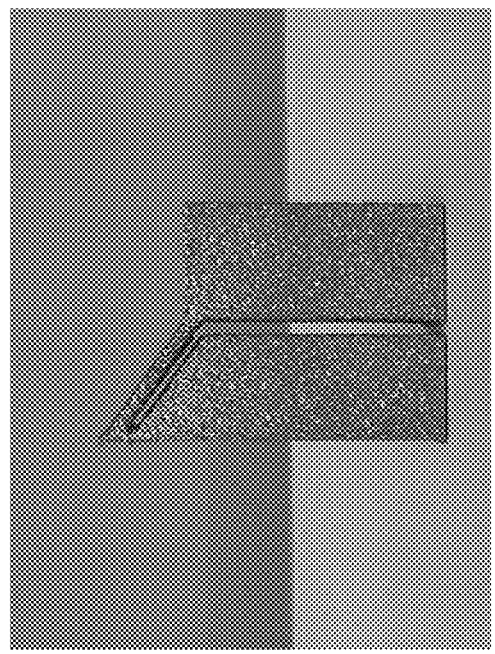
FIG. 17 illustrates a front view of a part having a sloped overhang portion and minimal contact support structure according to one implementation.

In the implementations described above, the lower surface 62 of the overhang portion 61 and the parallel support portion 66 are substantially parallel with the build plate 72. However, in other implementations, such as shown in FIGS. 17 and 18, the lower surface 62 of the overhang portion 61 and the parallel support portion 66 may be disposed at an angle greater than 0° with respect to the build plate. For example, in FIG. 17, the lower surface 62 of the overhang portion 61 and the upper surface of the parallel support portion 66 are sloped upwardly away the build plate 72 at an angle of about 35° with respect to the build plate 72. As another example, in FIG. 18, the lower surface 62 of the overhang portion 61 and the upper surface of the parallel support portion 66 are sloped downwardly toward the build plate 72 at an angle of about 35° with respect to the build plate 72.

Figure 7:
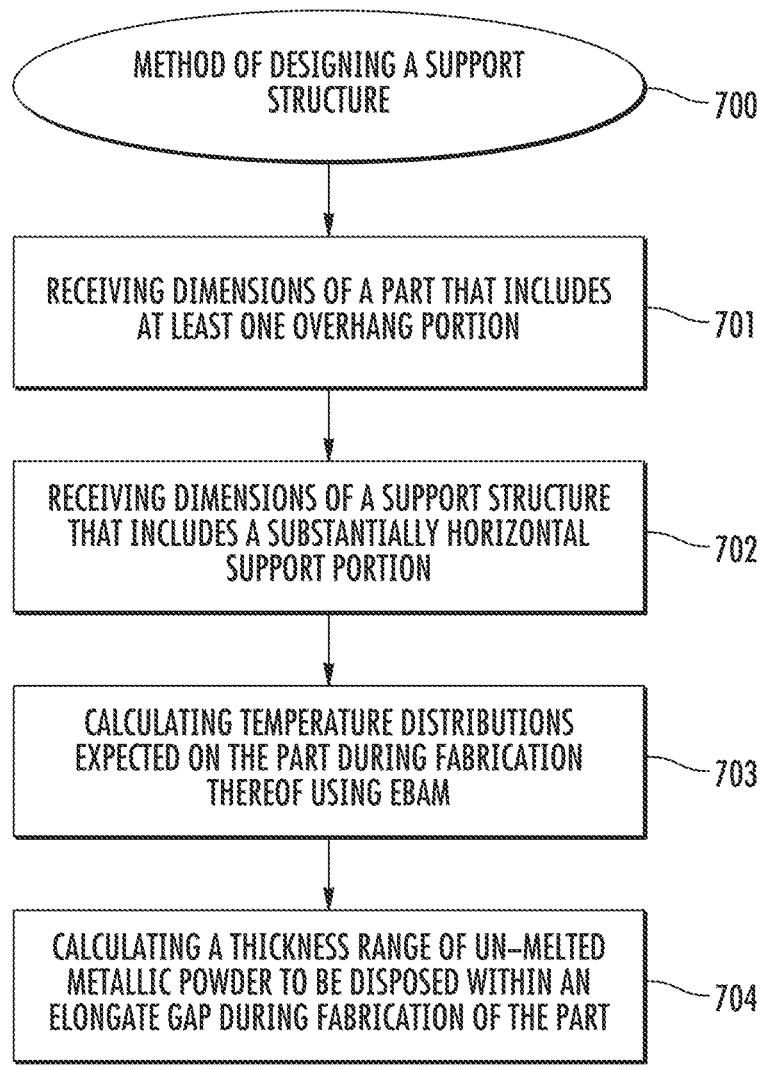
FIG. 7 illustrates a method of designing a support structure according to one implementation.

FIG. 7 illustrates a method of designing a support structure according to one implementation. In particular, the method begins at step 701 with receiving dimensions of a part that includes at least one overhang portion. In step 702, the dimensions of a support structure that includes a substantially horizontal support portion and one or more vertical support portions are received. In step 703, the temperature distributions expected on the part during fabrication thereof using electron beam additive manufacturing are calculated. Then, in step 704, a thickness range of un-melted metallic powder to be disposed within an elongate gap during fabrication of the part is calculated. Calculating the thickness range includes balancing conduction of heat from the overhang portion to the substantially parallel support portion against potential or minimal fusion of the un-melted metallic powder.

For example, in designing a support structure for a simple overhang configuration, such as shown in FIG. 3B, a finite element simulation is conducted using a commercial software package for transient heat transfer analyses of a simple overhang configuration such as is shown in FIG. 3B, according to one implementation. The simulation assumes that the electron beam is moving at a constant speed, without and with the invented support. The software package may be ABAQUS, for example.

Figure 4:
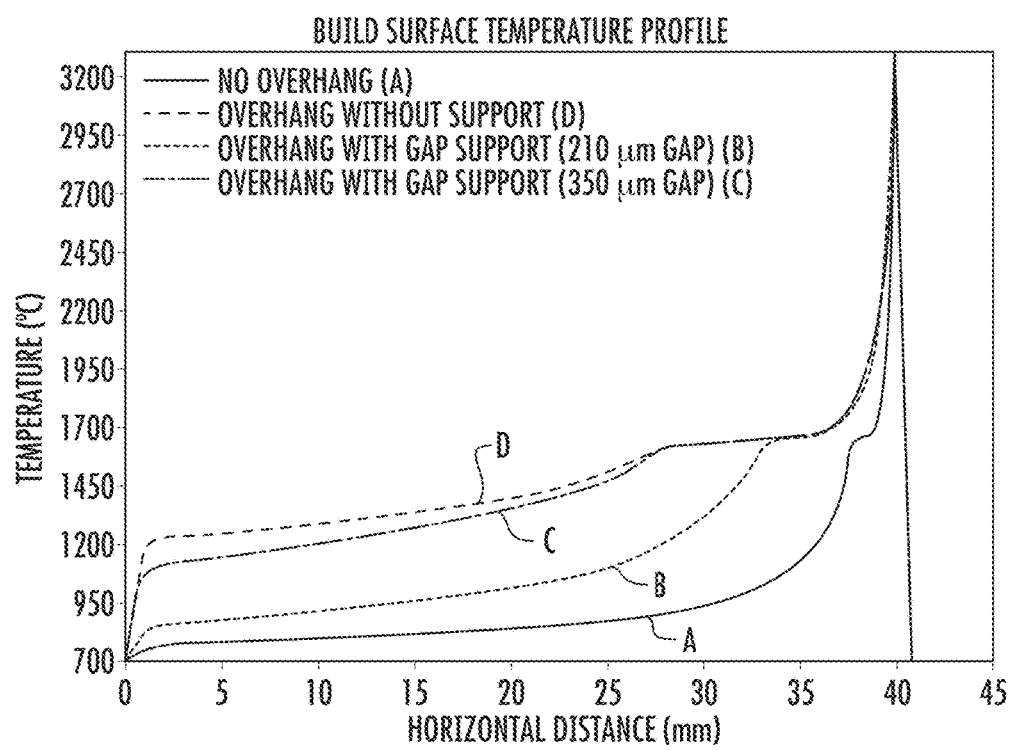
FIG. 4 illustrates a graph that compares build part surface temperature profiles when fabricating the first overhang layer with the following scenarios: no overhang, or overhang without and with the designed support of different gap sizes.

FIG. 4 illustrates the simulated build part surface temperature profiles when fabricating the first overhang layer under different scenarios: no overhang (line A), or an overhang without a support structure (line D), and an overhang with the above-described contact-free support structure and different gap sizes (lines B and C). In particular, a gap of 210 μm (see line B) yields lower temperatures across the length of the build part surface than a 350 μm gap (see line C) or having no support at all (see line D). The results demonstrate the effectiveness of substantial temperature reductions, which consequently alleviates thermal stresses, by adding the contact-free support structure. The results also illustrate the importance of the gap size.

The simulation assumes that electron beam additive manufacturing is used to fabricate the part and support structure using a Ti-6Al-4V alloy powder. The x-axis refers to the distance from the beginning of the electron beam scanning. The temperature profiles in the plot imply that the electron beam scans from left to right. The low temperature on the far right is the initial temperature before the electron beam reaches the area. The peak temperature (over 3000° C.) can approximate as the instantaneous electron beam location at that moment. The sharp temperature rise, which is around 40 mm from the scanning beginning location in this simulation, is due to the high-energy intensity of the electron beam and the high moving speed. Once the beam passes, the temperature drops fairly quickly due to the rapid self-cooling by the material beneath the surface. The plateau region corresponds to the melting/solidification temperature range (about 1665° C. for the simulated material). Once the solidification phase is completed, the temperature continues to decay and eventually back to the initial temperature of about 700° C. The temperature curves are obtained by a numerical method, such as finite element analysis.

Figure 8:
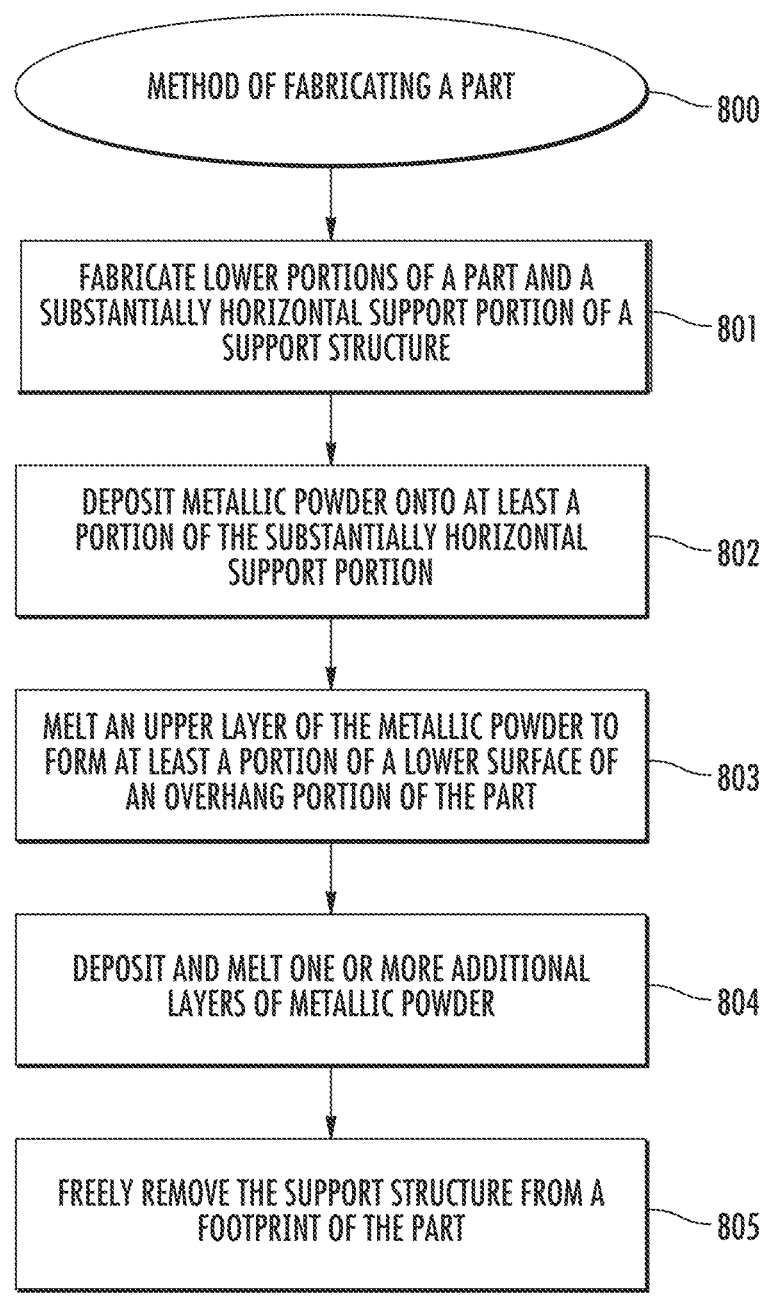
FIG. 8 illustrates a method of fabricating a part having at least one overhang portion according to one implementation.

FIG. 8 illustrates a method of fabricating a part that includes at least one overhang portion according to one implementation. In step 801, lower portions of the part and a substantially parallel support portion of the support structure are fabricated using additive manufacturing. Depending on the configuration of the part, one or more additional vertical support portions may be fabricated to extend between the parallel support portion and the build plate. In step 802, metallic powder is deposited onto at least a portion of the substantially parallel support portion. In step 803, an upper layer of the metallic powder is melted using a heat source to form at least a portion of a lower surface of an overhang portion of the part. In step 804, one or more additional layers of metallic powder are deposited and melted on the upper layer until a desired thickness of the overhang portion is achieved. Then, in step 805, the support structure is freely removed from a footprint of the part.

Exemplary advantages of the contact-free or minimal support structure are that they eliminate overhang-associated defects and there is no or minimal post-processing removal step. In addition, this structure provides process performance enhancement, simplifies designs, and improves part quality.

The described methods, systems, and apparatus should not be construed as limiting in any way. Instead, the present disclosure is directed toward all novel and nonobvious features and aspects of the various disclosed implementations, alone and in various combinations and sub-combinations with one another. The disclosed methods, systems, and apparatus are not limited to any specific aspect, feature, or combination thereof, nor do the disclosed methods, systems, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, systems, and apparatus can be used in conjunction with other systems, methods, and apparatus.

The invention claimed is:

1. An article of manufacture comprising:
   a primary part comprising at least one overhang portion, the overhang portion having a lower surface;
   a secondary part comprising a parallel support portion and at least one substantially vertical support portion extending between the parallel support portion and the lower surface of the overhang portion, the parallel support portion lying within a plane that is substantially parallel with the lower surface of the overhang portion,
   wherein:
      the lower surface of the overhang portion and the secondary part are fabricated during one process using the same metallic powder, and
      an upper surface of the parallel support portion of the secondary part and the lower surface of the overhang portion of the primary part define an elongate gap therebetween, and un-melted metallic powder is disposed within the gap, and
      the at least one vertical support portion has a first surface area in contact with the lower surface of the overhang portion, and the lower surface of the overhang portion has a second surface area that includes a total surface area of the lower surface, including the first surface area of the at least one vertical support portion, and a ratio of the first surface area to the second surface area is less than or equal to about 0.02.

2. The article in claim 1, wherein the at least one vertical support portion comprises a first vertical support portion and a second vertical support portion, and the first surface area comprises the sum of the surface area of the first vertical support portion and the surface area of the second vertical support portion in contact with the lower surface of the overhang portion.

3. The article of claim 1, wherein the at least one vertical support portion has a first outer perimeter length around an outer portion of the first surface area and the lower surface of the overhang portion has a second outer perimeter length, wherein a ratio of the first outer perimeter length to the second outer perimeter length is less than or equal to about 0.13.

4. The article of claim 1, wherein the at least one vertical support portion is an upper vertical support portion and the secondary part further comprises at least one lower vertical support portion, the at least one lower vertical support portion extending between the parallel support portion and a build plate, the lower vertical support portion configured for conducting heat from the parallel support portion to the build plate.

5. The article of claim 4, wherein the parallel support portion and the elongate gap are substantially parallel to the build plate.

6. The article of claim 4, wherein the parallel support portion and the lower surface of the overhang portion extend at an angle greater than 0° relative to the build plate.

7. The article of claim 4, wherein the lower vertical support portion comprises at least one leg extending between the parallel support portion and the build plate.

8. The article of claim 7, wherein the parallel portion of the secondary part defines a perimeter, and the at least one leg comprises two or more legs that extend between the perimeter of the parallel portion to the build plate and are spaced apart from each other.

9. The article of claim 8, wherein the parallel portion of the secondary part is rectangularly shaped, and each of the two or more legs are disposed at corners of the parallel portion.

10. The article of claim 4, wherein the lower vertical support portion comprises one or more side walls that extend between a perimeter of the parallel support portion and the build plate.

11. The article of claim 10, wherein the gap is a parallel gap, and a vertical gap is defined between the primary part and the side wall adjacent the primary part, wherein un-melted powder is disposed within the vertical gap.

12. The article of claim 4, wherein the un-melted powder in the gap is configured for conducting heat from the overhang portion to the secondary part without fusing.

13. The article of claim 1, wherein the one process comprises electron beam additive manufacturing.

14. The article of claim 1, wherein the un-melted powder is disposed in a layer-by-layer fashion.

15. The article of claim 1, wherein the overhang portion is a cantilever.

16. The article of claim 1, wherein the overhang portion is an undercut portion.

* * * * *